(12) United States Patent
Saitoh et al.

(10) Patent No.: US 7,123,412 B2
(45) Date of Patent: Oct. 17, 2006

(54) OPTICAL DEVICE

(75) Inventors: Hideshi Saitoh, Hyogo (JP); Eiichi Kameda, Hyogo (JP)

(73) Assignee: Daishinku Corporation, Hyogo (JP)

( * ) Notice: Subject to any disclaimer, the term of this patent is extended or adjusted under 35 U.S.C. 154(b) by 1118 days.

(21) Appl. No.: 09/959,347

(22) PCT Filed: Feb. 28, 2001

(86) PCT No.: PCT/JP01/01477

§ 371 (c)(1),
(2), (4) Date: Dec. 13, 2001

(87) PCT Pub. No.: WO01/65306

PCT Pub. Date: Sep. 7, 2001

(65) Prior Publication Data

US 2002/0158985 A1   Oct. 31, 2002

(30) Foreign Application Priority Data

Feb. 29, 2000 (JP) .............................. 2000-053380
Dec. 6, 2000 (JP) .............................. 2000-370887

(51) Int. Cl.
*G02B 27/28* (2006.01)
(52) U.S. Cl. ...................... 359/494; 257/432
(58) Field of Classification Search ................ 257/432; 359/494
See application file for complete search history.

(56) References Cited

U.S. PATENT DOCUMENTS 5,463,496 A    10/1995  Ise 6,963,448 B1 *  11/2005  Hayakawa .................. 359/494
2002/0158985 A1 *  10/2002  Saitoh et al. ............... 348/340

FOREIGN PATENT DOCUMENTS

| JP | 59011085 | 1/1984 |
|----|----------|--------|
| JP | 60242420 | 12/1985 |
| JP | 2100018 | 4/1990 |
| JP | 3031813 | 2/1991 |
| JP | 3046615 | 2/1991 |
| JP | 3293316 | 12/1991 |
| JP | 4-20767 | 2/1992 |
| JP | 7-25770 | 6/1995 |
| JP | 10054960 | 2/1998 |
| JP | 10186284 | 7/1998 |

* cited by examiner

*Primary Examiner*—Mark V. Prenty
(74) *Attorney, Agent, or Firm*—Rader, Fishman & Grauer PLLC

(57) ABSTRACT

An optical device of the present invention comprises an image sensing device, a package for accommodating the image sensing device, the package including an opening of a square configuration as viewed in plan, and an optical low-pass filter having square-shaped major surfaces and fixed in the opening by means of a UV-curable adhesive. The optical low-pass filter comprises a 45-degree splitting birefringent plate which is machine-cut in such a manner as to split an incident beam in a direction of 45 degrees and to form a two-point split pattern. The optical low-pass filter is formed with a color compensation filter and/or an anti-reflection filter, and further provided with a UV transmission area (e.g. notches, angular grooves) for curing the UV-curable adhesive.

22 Claims, 12 Drawing Sheets (a)　　　　　　　(b)

(a) (b)

(a) (b)

(a)          (b)

(a)          (b)

(a)　　　　　　　　　(b)

(a)　　　　　　　　　(b)

(a)

(b)

(c)

(d)

OPTICAL DEVICE

TECHNICAL FIELD

The present invention relates to an optical device used for an image sensor in a video camera or an electronic still camera.

BACKGROUND ART

In an optical device used for a common video camera, solid-state image sensing device are arranged along the optical axis in the order of, from the object side, a combined optical system, an optical low-pass filter, a color separation filter, a CCD (Charge Coupled Device), an MOS (Metal Oxide Semiconducter), etc. Among these elements which constitute an optical device, the optical low-pass filter serves to filter optical spurious signals detected by an image sensing device, thereby preventing deterioration of the image quality of the video camera. Conventionally, if the color information of an object resembles the pixel pitch of the image sensing device like the CCD (for example, in the case of plaid), when such an object is recorded, spurious signals which are different from the actual image information may be generated in the image sensing device, which causes the colors of an output image to blur (Moire phenomenon). The optical low-pass filter is employed to cut off and attenuate the spatial frequency components associated with such spurious signals. Recently, miniaturized video cameras, etc., which contain smaller space for accommodating the optical device, have created a demand for housing the optical device effectively in a limited accommodation space. For example, in the disclosure of Japanese Patent Laid-open Publication No. S59-11085, the package for accommodating the CCD is directly sealed with an optical low-pass filter, without a cover. Incidentally, electronic still cameras are employed for image acquisition by a personal computer or for a videophone. As the CCD to be used in this application, pixels are arranged on a square lattice, in an equal pitch both horizontally and vertically.

With regard to the CCD for electronic still cameras, the optical low-pass filter employed with the CCD should be made in a square shape that matches the shape of the CCD. Besides, when the optical low-pass filter is mounted, it should be correctly oriented lengthwise and widthwise. If the length and width of the optical low pass filter is wrongly oriented, it cannot ensure desired filter characteristics nor remove spurious signals, only to provide a defective product. In order to indicate the correct lengthwise/widthwise orientation, traditional technologies include a marking step of forming the optical low-pass filter with a notch or the like in the direction of the optical axis. However, this additional step has inevitably raised the cost.

On the other hand, the optical device has been investigated for another use as a simple camera at the mobile terminal. In this case, the camera incorporates only the necessary parts among the above-mentioned optical device elements (i.e. combined optical system and solid-state image sensing device). The optical device for this application is generally equipped with a cover. The cover is fitted with a step which is formed at the opening in the package and which has a shape fittable with the cover.

From another aspect, the solid-state image sensing device particularly tends to produce unnatural colors, owing to the transmission of infrared rays. For this reason, the package for accommodating the solid-state image sensing device is made of a non-light-transmissive material, and the cover is provided with an IR-cut coating. In this structure, the step and the cover are attached by a UV-curable resin adhesive, so as to shorten the temporary curing time and thus to avoid the adverse influence by heat.

Although this optical device has the arrangement for cutting off the infrared rays, the IR-cut coating applied to the cover also shuts off ultraviolet rays. After all, the UV-curable resin adhesive used for attachment of the step and the cover cannot be cured enough, resulting in sealing failure at the cover.

In order to deal with this problem, traditional technologies have made some considerations. In one arrangement, a mask jig is placed on the cover, so that the IR-cut coating is deposited except where the UV-curable resin adhesive is applied. Alternatively, a thermosetting resin adhesive is employed instead of the UV-curable resin adhesive.

Nevertheless, the former arrangement increases the production steps, because the covers need to be processed one by one. Besides, the mask should be individually prepared for covers of various sizes. In the end, the former arrangement shows poor production efficiency, despite the inevitable cost increase. As for the latter arrangement, the thermosetting resin adhesive requires a few minutes for temporary curing, whereas the UV-curable resin adhesive cures in just a few seconds. Under longer exposure to heat, the solid-state image sensing device cannot avoid unfavorable influence by heat.

The present invention is to solve the above-mentioned various problems concerning the optical devices.

The first object is to provide an optical device which can reduce the weight and size of the optical device, which can be produced easily, unaffected by the lengthwise/widthwise orientation of mounting the optical low-pass filter, and which does not degrade the filter function of the optical low-pass filter.

The second object is to provide an optical device which can protect the solid-state image sensing device from the adverse influence caused by infrared rays, and which can be sealed precisely.

DISCLOSURE OF THE INVENTION

For the purpose of solving the above problems, an optical device of the present invention is characterized in comprising: an image sensing device; a package for accommodating the image sensing device, the package including an opening of a square configuration as viewed in plan; and an optical low-pass filter having square-shaped major surfaces and provided in the opening.

In this arrangement, while the opening presents a square configuration as viewed in plan, the optical low-pass filter to be mounted therein has square-shaped major surfaces. As a result, the optical low-pass filter does not have to be positioned lengthwise or widthwise.

Regarding this arrangement, the invention corresponding to claim 2 is arranged such that the optical low-pass filter comprises a 45-degree splitting birefringent plate which is machine-cut in such a manner as to split an incident beam in a direction of 45 degrees and to form a two-point split pattern.

When the optical low-pass filter of this arrangement is mounted as rotated ±90° or as reversed, the resulting patterns show an equal positional constitution, so that all optical low-pass filters thus obtained can exhibit the same characteristics. As a result, there is no need for a marking step of forming a notch or the like in the direction of the optical axis, which is intended to indicate the correct lengthwise/ widthwise and front/back orientation of the optical low-pass filter. Omission of this step can improve the workability and reduce the cost.

With respect to the arrangement of such optical low-pass filter, the invention corresponding to claim 3 is arranged such that the optical low-pass filter comprises, in a laminated state, a horizontally splitting birefringent plate which is machine-cut in such a manner as to split an incident beam in a horizontal direction, a vertically splitting birefringent plate which is machine-cut in such a manner as to split an incident beam in a vertical direction, and a 45-degree splitting birefringent plate, sandwiched therebetween, which is machine-cut in such a manner as to split an incident beam in a direction of 45 degrees. In this case, the horizontally splitting birefringent plate and the vertically splitting birefringent plate are arranged to have the same thickness.

The invention corresponding to claim 4 is arranged such that the optical low-pass filter comprises, in a laminated state, two birefringent plates whose split directions are orthogonal to each other, and a depolarizer interposed therebetween.

With respect to the arrangement of claim 4, the two birefringent plates may be a horizontally splitting birefringent plate which is machine-cut in such a manner as to split an incident beam in a horizontal direction, and a vertically splitting birefringent plate which is machine-cut in such a manner as to split an incident beam in a vertical direction. In this case, these birefringent plates are arranged to have the same thickness.

The invention corresponding to claim 6 is arranged such that the optical low-pass fitter comprises, in a laminated state, two birefringent plates whose split directions are orthogonal to each other, and a birefringent plate which is laid adjacent to at least one of these birefringent plates and whose split direction is rotated ±45° or ±135° relative to the adjacent birefringent plate or plates. In this case, the two birefringent plates whose split directions are orthogonal to each other are arranged to have the same thickness.

The invention corresponding to claim 7 is arranged such that the optical low-pass filter comprises a vertically splitting birefringent plate which is machine-cut in such a manner as to split an incident beam in a vertical direction, a horizontally splitting birefringent plate which is machine-cut in such a manner as to split an incident beam in a horizontal direction, and a 45-degree splitting birefringent plate, interposed therebetween, which is machine-cut in such a manner as to split an incident beam in a direction of 45 degrees. In addition, there is laminated another 45-degree splitting birefringent plate whose split direction is orthogonal to that of the first 45-degree splitting birefringent plate and which lies adjacent to either the vertically splitting birefringent plate or the horizontally splitting birefringent plate. In this case, the vertically splitting birefringent plate and the horizontally splitting birefringent plate are arranged to have the same thickness. Similarly, the first 45-degree splitting birefringent plate and the other 45-degree splitting birefringent plate are arranged to have the same thickness.

The invention corresponding to claim 8 is arranged such that the optical low-pass filter comprises, in a laminated state, three 45-degree splitting birefringent plates each of which is machine-cut in such a manner as to split an incident beam in a direction of 45 degrees, and a depolarizer interposed between the respective 45-degree splitting birefringent plates.

Preferably, the optical low-pass filter according to the above arrangements is formed with a color compensation filter and/or an anti-reflection filter. In this arrangement, the color compensation filter may comprise at least one of an IR-cut filter and a UV-cut filter. Besides, the color compensation filter comprises at least one or more of a coating component, a glass component and a resin component.

Likewise, the anti-reflection filter may comprise a coating component.

Further, according to the invention which corresponds to claim 13, the optical device is arranged such that the optical low-pass filter is fixed in the opening in the package by means of a UV-curable adhesive.

According to the invention which corresponds to claim 14, the optical device is characterized in that: a positioning step is formed along a periphery of either the opening in the package or the optical low-pass filter; and the optical low-pass filter is attached in the opening by means of the step.

According to the invention which corresponds to claim 15, the optical device is characterized in that: a step is formed along a periphery of the opening in the package, and the optical low-pass filter is fixed on the step by means of a UV-curable adhesive; the color compensation filter and/or the antireflection filter is formed on a top surface of the optical low-pass filter; and a UV transmission area is formed above the UV-curable adhesive by removing a part of the color compensation filter and/or the anti-reflection filter and a corresponding part of the optical low-pass filter adjacent to the color compensation filter and/or the anti-reflection filter.

In this arrangement, the UV transmission area may be a notch formed along each edge of the top surface of the optical low-pass filter or an angular groove formed in the vicinity of each edge of the top surface.

According to the invention which corresponds to claim 17, the optical device is characterized in that the UV transmission area is formed along four edges of the top surface of the optical low-pass filter, in such a manner that the UV transmission area along one of the edges has a different configuration from the UV transmission area along the other edges.

According to the invention which corresponds to claim 18, the optical device is characterized in that the UV transmission area is formed along four edges of the top surface of the optical low-pass filter, in such a manner that the UV transmission area along opposing edges has the same configuration.

According to the invention which corresponds to claim 19, the optical device is characterized in comprising: an image sensing device; a package for accommodating the image sensing device, the package including an opening of a square configuration as viewed in plan; a step formed along a periphery of the opening; and a light-transmissive cover which is fixed on the step by means of a UV-curable adhesive. It is also characterized in that a color compensation filter and/or an anti-reflection filter is formed on a top surface of the cover, and that a UV transmission area is formed above the UV-curable adhesive by removing a part of the color compensation filter and/or the anti-reflection filter and a corresponding part of the cover adjacent to the color compensation filter and/or the anti-reflection filter.

In this arrangement, the UV transmission area may be a notch formed along each edge of the top surface of the cover or an angular groove formed in the vicinity of each edge of the top surface.

According to the invention which corresponds to claim 21, the optical device is characterized in that the UV transmission area is formed along four edges of the top surface of the cover, in such a manner that the UV transmission area along one of the edges has a different configuration from the UV transmission area along the other edges.

According to the invention which corresponds to claim 22, the optical device is characterized in that the UV transmission area is formed along four edges of the top surface of the cover, in such a manner that the UV transmission area along opposing edges has the same configuration.

With respect to the above inventions, where the optical low-pass filter or the cover is sealed by means of a UV-curable adhesive, the UV transmission area allows ultraviolet rays to reach the UV-curable adhesive without hindrance and to effect sufficient curing.

BEST MODE FOR CARRYING OUT THE INVENTION

Embodiments of the present invention are hereinafter described with reference to the drawings.

<First Embodiment>

Figure 1:
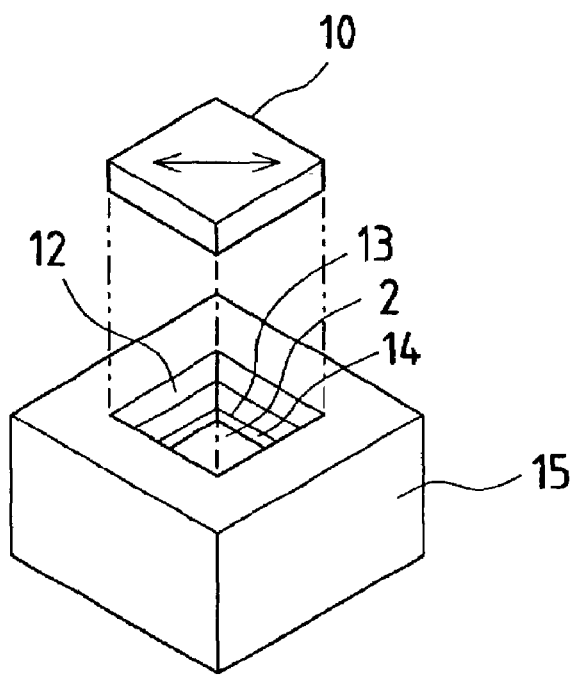
FIG. 1 is an exploded perspective view showing the first embodiment of the present invention.
Figure 2:
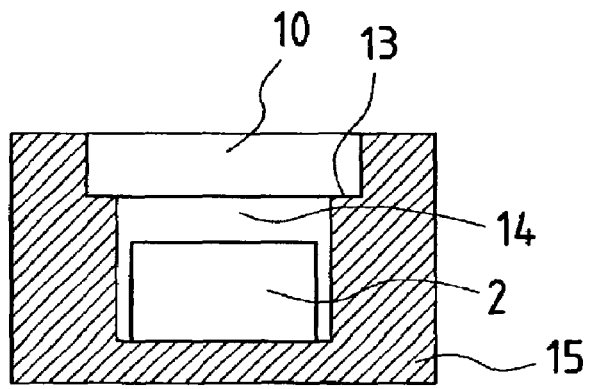
FIG. 2 is a schematic section of the first embodiment.
Figure 3:
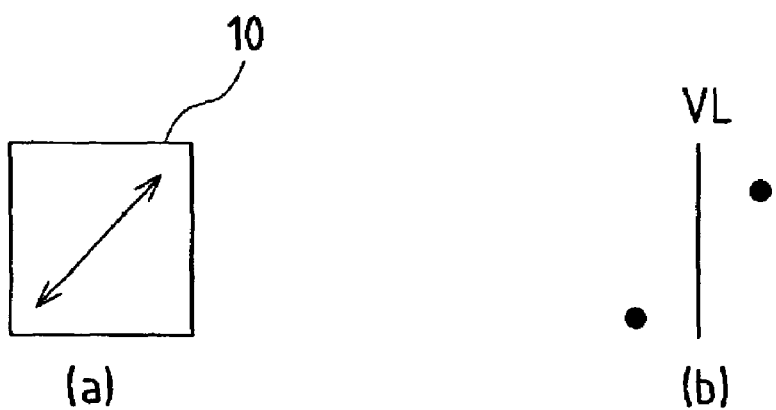
FIG. 3(a) shows the direction of beams which are split by the optical low-pass filter used in the first embodiment.
FIG. 3(b) represents a split pattern by the optical low-pass filter.

FIG. 1 is an exploded perspective view showing the first embodiment of the present invention. FIG. 2 is a schematic section of the first embodiment. FIG. 3(a) shows the direction of beams which are split by the optical low-pass filter used in the first embodiment, and FIG. 3(b) represents a split pattern by the optical low-pass filter. FIG. 4(a) shows the direction of split beams, when the optical low-pass filter of FIG. 3 is rotated ±90° or reversed, and FIG. 4(b) represents a split pattern by the optical low-pass filter.

The optical device of this embodiment comprises a CCD 2, a package 15 including an opening 12 of a square configuration as viewed in plan, and an optical low-pass filter 10 which has square-shaped major surfaces and which is mounted to seal the opening 12. In the CCD 2, pixels are arranged on a square lattice, with the pixel pitch being equal in the horizontal and vertical directions. The package 15 is made of a non-light-transmissive material and formed, for example, by resin molding. An accommodation space 14 inside the package 15 and the opening 12 are formed in a square shape as viewed in plan, so that their shape corresponds to that of the major surfaces of the CCD 2. The CCD 2 is secured at the bottom of the accommodation space 14 by an adhesive, and electrically connected with the bottom. In addition, the opening 12 includes a step 13. By means of an adhesive, the optical low-pass filter 10 is fixed on the step 13 in a fitted manner, thereby air-tightly sealing the package 15. In this structure, the relative distance between the CCD 2 and the optical low-pass filter 10 is designed to an optimum value, based on the dimension of the package 15.

Figure 4:
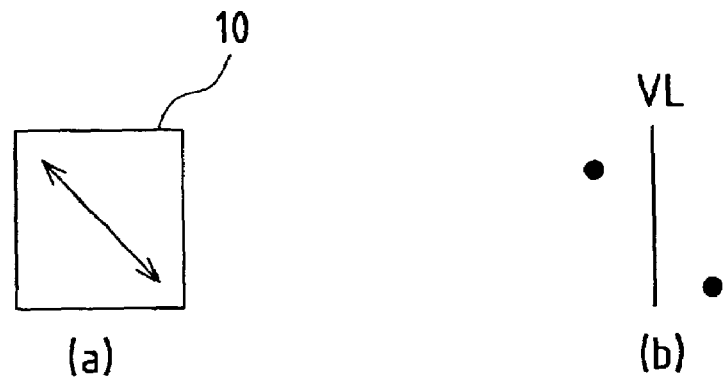
FIG. 4(a) shows the direction of split beams, when the optical low-pass filter of FIG. 3 is rotated ±90° or reversed.
FIG. 4(b) represents a split pattern by the optical low-pass filter.

The optical low-pass filter 10 used in this embodiment comprises a single piece of 45-degree splitting birefringent plate which is made of quartz having square-shaped major surfaces and formed by machine-cutting the quartz such that the incident beam can be split in the 45° direction. As illustrated in FIG. 3, the optical low-pass filter 10 splits the incident unit beam into two beams (two spots) in the 45° direction. Turning to FIG. 4, where the optical low-pass filter 10 shown in FIG. 3 is mounted as rotated ±90° or as reversed, the beam is likewise split into two beams (two spots) in the 45° direction. In terms of positional relationship, the pattern is symmetrical to the one shown in FIG. 3 about the vertical line VL (the centerline in the horizontal direction). To summarize, when such pattern is rotated ±90° or reversed, the positional components of respective patterns are equivalent. Therefore, the resulting optical low-pass filter has similar characteristics to the optical low-pass filter 10 of FIG. 3.

<Second Embodiment>

Figure 5:
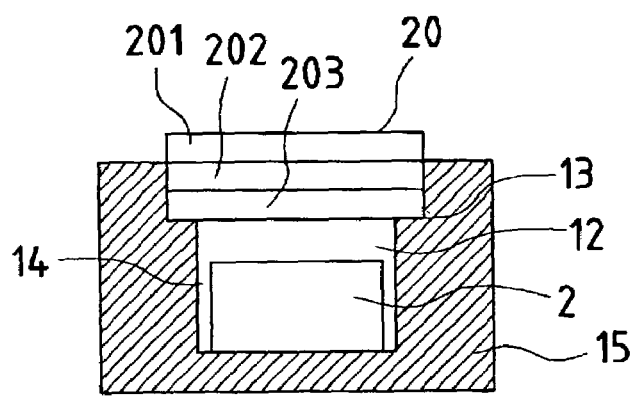
FIG. 5 is a schematic section of the second embodiment of the present invention.
Figure 6:
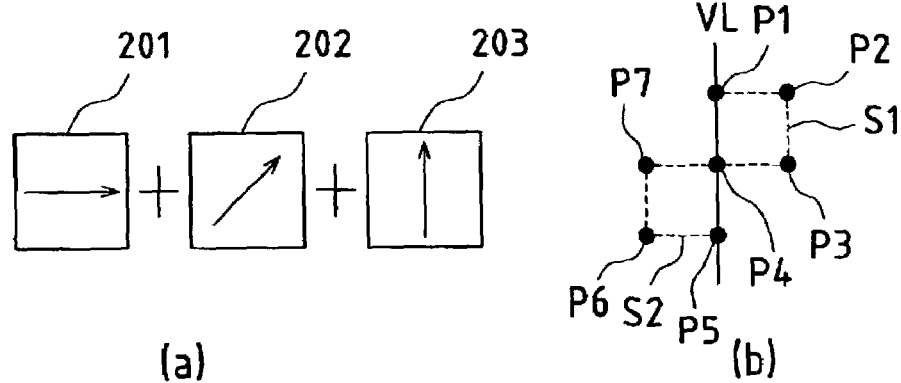
FIG. 6(a) shows the direction of beams which are split by each birefringent plate constituting the optical low-pass filter used in the second embodiment.
FIG. 6(b) represents a split pattern by the optical low-pass filter.
Figure 7:
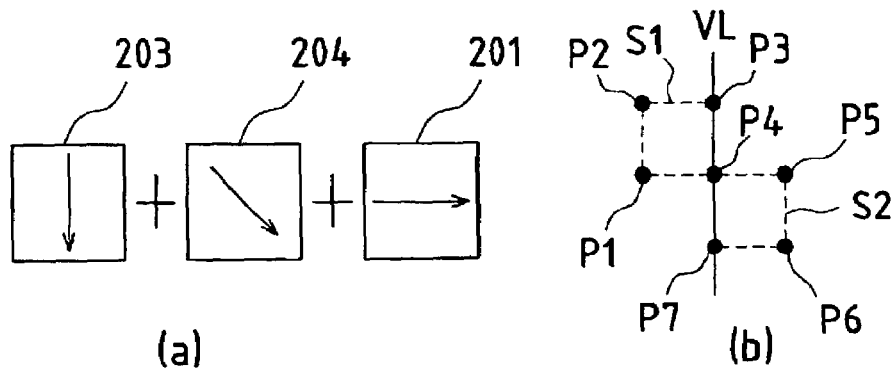
FIG. 7(a) shows the direction of beams which are split by each birefringent plate constituting the optical low-pass filter, when the optical low-pass filter of FIG. 6 is rotated ±90°.
FIG. 7(b) represents a split pattern, when the optical low-pass filter of FIG. 6 is rotated ±90°.

FIG. 5 is a schematic section of the second embodiment of the present invention. FIG. 6(*a*) shows the direction of beams which are split by each birefringent plate constituting the optical low-pass filter used in the second embodiment, and FIG. 6(*b*) represents a split pattern by the optical low-pass filter. FIG. 7(*a*) shows the direction of beams which are split by each birefringent plate constituting the optical low-pass filter, when the optical low-pass filter of FIG. 6 is rotated ±90°, and FIG. 7(*b*) represents a split pattern, when the optical low-pass filter of FIG. 6 is rotated ±90°. Where the structures in this embodiment are similar to those mentioned in the first embodiment, the same signs are allotted to omit their explanation.

The second embodiment is distinguished from the first embodiment by the structure of the optical low-pass filter 20. The optical low-pass filter 20 comprises a horizontally splitting birefringent plate 201 which is machine-cut in such a manner as to split incident beams in the horizontal direction, a 45-degree splitting birefringent plate 202 which is machine-cut in such a manner as to split beams in the 45° direction, and a vertically splitting birefringent plate 203 which is machine-cut in such a manner as to split beams in the vertical direction. As viewed from the incident surface, these three plates are laminated in the order mentioned, with the use of an adhesive. Each of these birefringent plates 201, 202, 203 is made of quartz having square-shaped major surfaces, and formed such that the external dimension of the major surfaces is equal among these plates.

The horizontally splitting birefringent plate 201 and the vertically splitting birefringent plate 203 may have the same thickness, while the 45-degree splitting birefringent plate 202 may have a thickness equal to $\sqrt{2}$ (the square root of two) times that of the horizontally splitting birefringent plate 201 or the vertically splitting birefringent plate 203. Under such circumstances, the split pattern is represented by seven points P1 to P7, as illustrated in FIG. 6. It should be understood that the broken lines in the drawings are supplementary lines added for the convenience of explaining the split patterns, and they do not appear in the split pattern itself.

The split pattern shown in FIG. 6(*b*) is observed at the vertices (P1, P2, P3, P4 and P4, P5, P6, P7) of two squares S1, S2 which share the point P4 as the common vertex. In this split pattern, the square S1 and the square S2 have point symmetry about the point P4, Where the optical low-pass filter 20 showing this split pattern is mounted as rotated ±90° or as reversed, the resulting pattern shown in FIG. 7(*b*) is symmetrical to the one shown in FIG. 6(*b*) about the vertical line VL (the center line in the horizontal direction), in terms of positional relationship. When such pattern, is rotated ±90° or reversed, the positional components of respective patterns are equivalent. Therefore, the resulting optical low-pass filter has similar characteristics to the optical low-pass filter 20 of FIG. 6.

Figure 8:
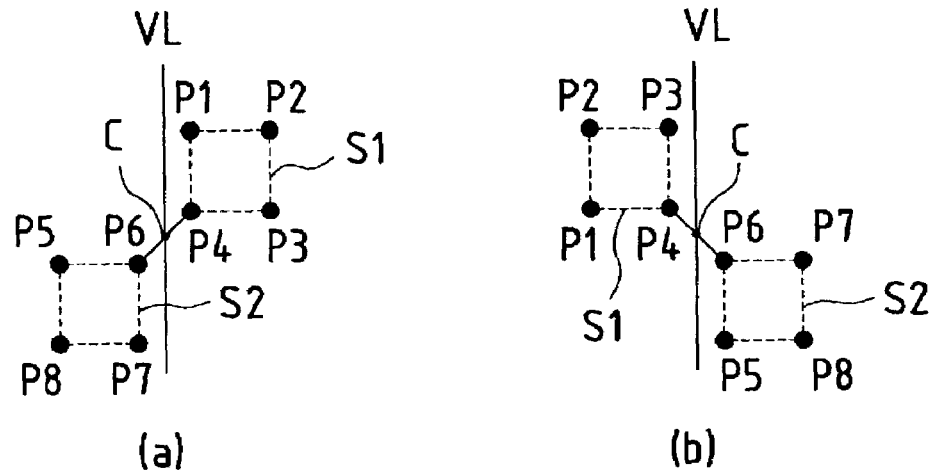
FIG. 8(a) shows a split pattern by the optical low-pass filter used in a modified example of the second embodiment, and FIG. 8(b) describes a split pattern observed when the split pattern of FIG. 8(a) is rotated ±90°.

Further, the horizontally splitting birefringent plate 201 and the vertically splitting birefringent plate 203 may have the same thickness, while the 45-degree splitting birefringent plate 202 may have a thickness greater than $\sqrt{2}$ (the square root of two) times that of the horizontally splitting birefringent plate 201 or the vertically splitting birefringent plate 203. Under such circumstances, the split pattern is represented by eight points P1 to P8, as illustrated in FIG. 8(*a*) or (*b*). The split pattern of FIG. 8(*b*) is observed when the optical low-pass filter which gives the split pattern of FIG. 8(*a*) is rotated ±90°. These split patterns appear at the vertices (P1, P2, P3, P4 and P5, P6, P7, P8) of two squares S1, S2, and they have point symmetry about the point C. Where the optical low-pass filter 20 showing such split pattern is mounted as rotated ±90°, the resulting pattern shown in FIG. 8(*b*) is symmetrical to the one shown in FIG. 8(*a*) about the vertical line VL (the center line in the horizontal direction), in terms of positional relationship. This means the positional components of respective patterns are equivalent. Therefore, the resulting optical low-pass filter has similar characteristics to the optical low-pass filter 20 of FIG. 6.

Furthermore, the horizontally splitting birefringent plate 201 and the vertically splitting birefringent plate 203 may have the same thickness, while the 45-degree splitting birefringent plate 202 may have a thickness less than $\sqrt{2}$ (the square root of two) times that of the horizontally splitting birefringent plate 201 or the vertically splitting birefringent plate 203. Under such circumstances, unlike the split pattern shown in FIG. 8, the vertices P4, P6 of the square S1 and the square S2 are respectively included in the other squares. Nevertheless, these split patterns also have symmetry about the middle point C of the segment joining P4 and P6. Where the optical low-pass filter 20 giving such split pattern is rotated ±90°, the resulting split pattern shown in FIG. 9(*b*) is equivalent to the one shown in FIG. 9(*a*).

As described above, the second embodiment can vary the modes of the split pattern which appears at the vertices of squares, by controlling the thickness ratio of the 45-degree splitting birefringent plate 202. This thickness ratio can be set suitably in accordance with the characteristics and design of desired optical devices.

Figure 9:
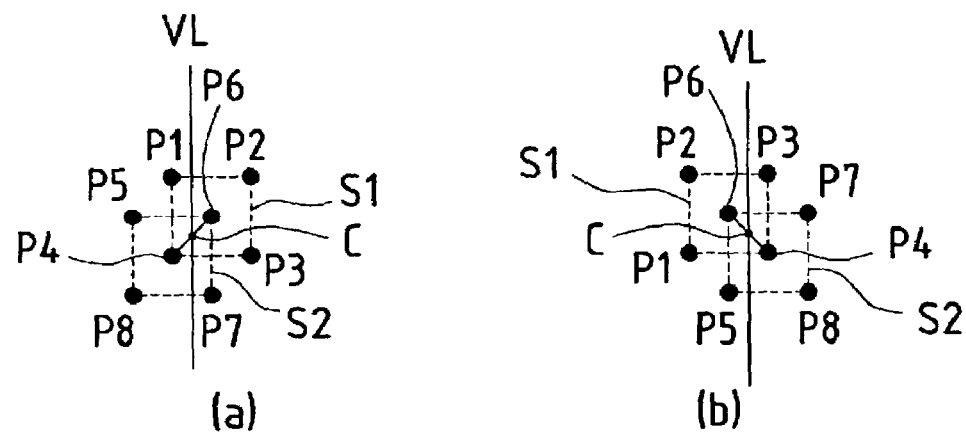
FIG. 9(a) shows a split pattern by the optical low-pass filter used in another modified example of the second embodiment, and FIG. 9(b) describes a split pattern observed when the split pattern of FIG. 9(a) is rotated ±90°.

In the description of the second embodiment, FIG. 7(*b*), FIG. 8(*b*) and FIG. 9(*b*) are mentioned as representative patterns obtained when the patterns of FIG. 6(*b*), FIG. 8(*a*) and FIG. 9(*a*) are rotated by ±90°, respectively. In addition, the same figures are applicable to the cases where the patterns of FIG. 6(b), FIG. 8(a) and FIG. 9(a) are reversed. Namely, when the optical low-pass filters which provide the patterns of FIG. 6(b), FIG. 8(a) and FIG. 9(a) are reversed, the same filter characteristics result from the respective split patterns, as described above.

<Third Embodiment>

Figure 10:
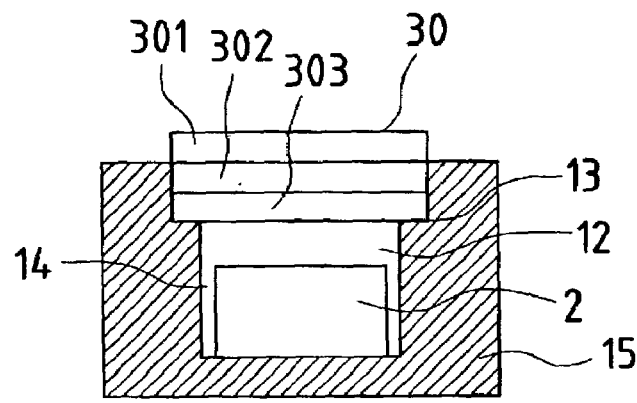
FIG. 10 is a schematic section of the third embodiment of the present invention.
Figure 11:
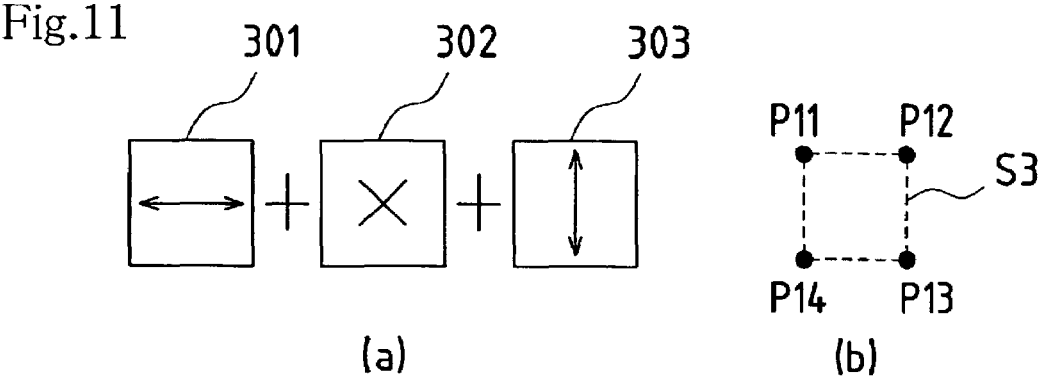
FIG. 11(a) shows the direction of beams which are split by each birefringent plate constituting the optical low-pass filter used in the third embodiment.
FIG. 11(b) represents a split pattern by the optical low-pass filter.

FIG. 10 is a schematic section of the third embodiment of the present invention. FIG. 11(a) shows the direction of beams which are split by each birefringent plate constituting the optical low-pass filter used in the third embodiment, and FIG. 11(b) represents a split pattern by the optical low-pass filter.

Where the structures in this embodiment are similar to those mentioned in the foregoing embodiments, the same signs are allotted to omit their explanation.

The third embodiment is distinguished from the above embodiments by the structure of the optical low-pass filter 30. The optical low-pass filter 30 comprises a horizontally splitting birefringent plate 301 which is machine-cut in such a manner as to split incident beams in the horizontal direction, a quarter-wave plate 302 as a depolarizer, and a vertically splitting birefringent plate 303 which is machine-cut in such a manner as to split beams in the vertical direction. As viewed from the incident surface, these three plates are laminated in the order mentioned, with the use of an adhesive. Each of these birefringent plates 301, 302, 303 is made of quartz having square-shaped major surfaces, and formed such that the external dimension of the major surfaces is equal among these plates. The horizontally splitting birefringent plate 301 and the vertically splitting birefringent plate 303 are formed in the same thickness. As shown in FIG. 11(b), this optical low-pass filter 30 splits the incident unit beam into four beams (four spots) which are observed at the vertices P11, P12, P13, P14 of the square S3. Therefore, although not shown, when the optical low-pass filter 30 is mounted as rotated ±90° or as reversed, it still gives the identical split pattern and ensures the same filter characteristics.

<Fourth Embodiment>

Figure 12:
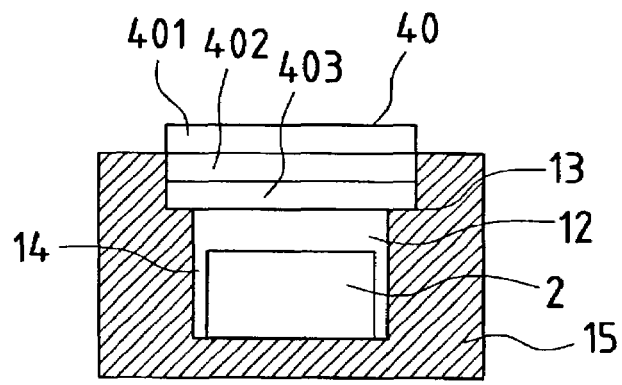
FIG. 12 is a schematic section of the fourth embodiment of the present invention.
Figure 13:
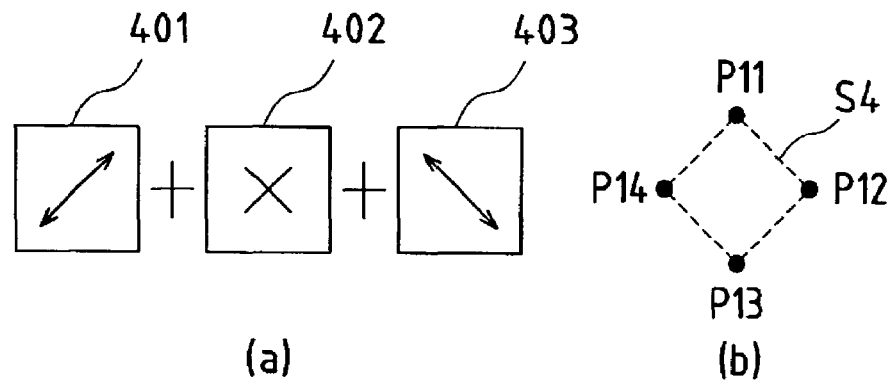
FIG. 13(a) shows the direction of beams which are split by each birefringent plate constituting the optical low-pass filter used in the fourth embodiment.
FIG. 13(b) represents a split pattern by the optical low-pass filter.

FIG. 12 is a schematic section of the fourth embodiment of the present invention. FIG. 13(a) shows the direction of beams which are split by each birefringent plate constituting the optical low-pass filter used in the fourth embodiment, and FIG. 13(b) represents a split pattern by the optical low-pass filter.

Where the structures in this embodiment are similar to those mentioned in the foregoing embodiments, the same signs are allotted to omit their explanation.

The fourth embodiment is distinguished from the above embodiments by the structure of the optical low-pass filter 40. The optical low-pass filter 40 comprises a 45-degree splitting birefringent plate 401 which is machine-cut in such a manner as to split incident beams in the 45° direction, a quarter-wave plate 402 as a depolarizer, and a 45-degree splitting birefringent plate 403. As viewed from the incident surface, these three plates are laminated in the order mentioned, with the use of an adhesive. Each of these birefringent plates 401, 402, 403 is made of quartz having square-shaped major surfaces, and formed such that the external dimension of the major surfaces is equal among these plates. The 45-degree splitting birefringent plates 401, 403 are formed in the same thickness. As shown in FIG. 13(b), this optical low-pass filter 40 splits the incident unit beam into four beams (four spots) which are observed at the vertices P11, P12, P13, P14 of the square S4. This square split pattern is similar to the split pattern of FIG. 11(b), except that the vertices of S4 locate where the square S3 is turned by ±90°. Although not shown, when the optical low-pass filter 40 of this embodiment is mounted as rotated ±90° or as reversed, it still gives the identical split pattern and ensures the same filter characteristics.

<Fifth Embodiment>

Figure 14:
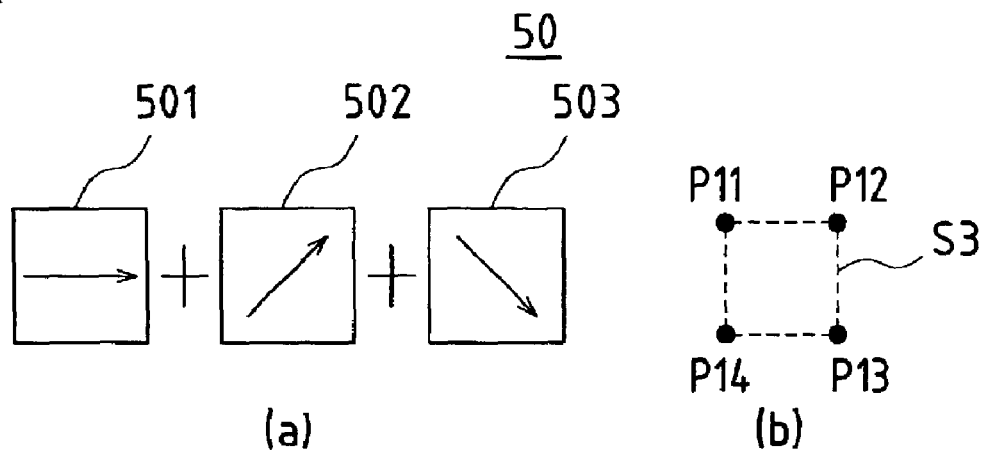
FIG. 14(a) shows the direction of beams which are split by each birefringent plate constituting the optical low-pass filter used in the fifth embodiment.
FIG. 14(b) represents a split pattern by the optical low-pass filter.

FIG. 14(a) shows the direction of beams which are split by each birefringent plate constituting the optical low-pass filter used in the fifth embodiment, and FIG. 14(b) represents a split pattern by the optical low-pass filter.

Where the structures in this embodiment are similar to those mentioned in the foregoing embodiments, the same signs are allotted to omit their explanation.

The fifth embodiment is distinguished from the above embodiments by the structure of the optical low-pass filter 50. The optical low-pass filter 50 comprises a horizontally splitting birefringent plate 501 which is machine-cut in such a manner as to split incident beams in the horizontal direction, and two 45-degree splitting birefringent plates 502, 503 each of which splits beams in the orthogonal direction to the other. As viewed from the incident surface, these three plates are laminated in the order mentioned, with the use of an adhesive. Each of these birefringent plates 501, 502, 503 is made of quartz having square-shaped major surfaces, and formed such that the external dimension of the major surfaces is equal among these plates. The 45-degree splitting birefringent plates 502, 503 have the same thickness, whereas the horizontally splitting birefringent plate 501 has a thickness equal to $\sqrt{2}$ (the square root of two) times that of the 45-degree splitting birefringent plate 502 (503). As shown in FIG. 14(b), this optical low-pass filter 50 splits the incident unit beam into four beams (four spots) which are observed at the vertices P11, P12, P13, P14 of the square S3. Therefore, although not shown, when the optical low-pass filter 50 is mounted as rotated ±90° or as reversed, it still gives the identical split pattern and ensures the same filter characteristics.

The fifth embodiment of the present invention is further described by way of another example.

Figure 15:
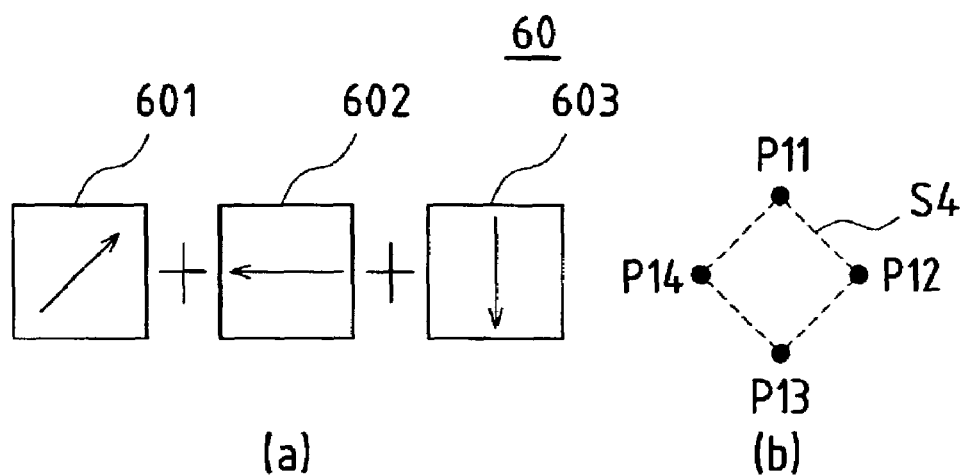
FIG. 15(a) shows the direction of beams which are split by each birefringent plate constituting the optical low-pass filter used in another example of the fifth embodiment.
FIG. 15(b) represents a split pattern by the optical low-pass filter.

FIG. 15(a) shows the direction of beams which are split by each birefringent plate constituting the optical low-pass filter used in another example of the fifth embodiment, and FIG. 15(b) represents a split pattern by the optical low-pass filter.

This embodiment is distinguished from the foregoing embodiments by the structure of the optical low-pass filter 60. The optical low-pass filter 60 comprises a 45-degree splitting birefringent plate 601 which is machine-cut in such a manner as to split incident beams in the 45° direction, a horizontally splitting birefringent plate 602, and a vertically splitting birefringent plate 603. As viewed from the incident surface, these plates are laminated in the order mentioned, with the use of an adhesive. Each of these birefringent plates 601, 602, 603 is made of quartz having square-shaped major surfaces, and formed such that the external dimension of the major surfaces is equal among these plates. The horizontally splitting birefringent plate 602 and the vertically splitting birefringent plate 603 are formed in the same thickness. As shown in FIG. 15(b), this optical low-pass filter 60 splits the incident unit beam into four beams (four spots) which are observed at the vertices P11, P12, P13, P14 of the square S4. This square split pattern is similar to the split pattern of FIG. 14(b), except that the vertices of S4 locate where the square S3 is turned by ±90°. Although not shown, when the optical low-pass filter 60 of this embodiment is mounted as rotated ±90° or as reversed, it still gives the identical split pattern and ensures the same filter characteristics.

<Sixth Embodiment>

Figure 16:
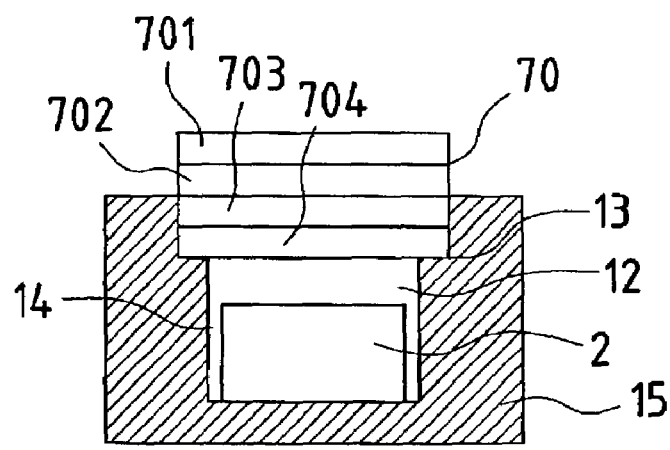
FIG. 16 is a schematic section of the sixth embodiment of the present invention.
Figure 17:
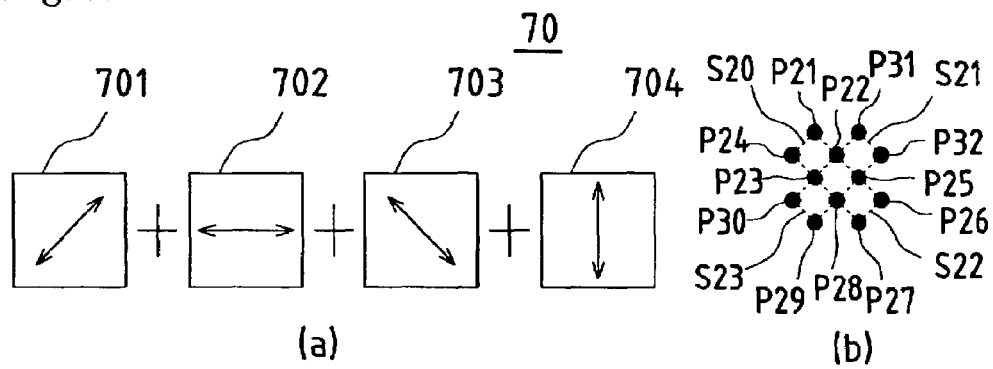
FIG. 17(a) shows the direction of beams which are split by each birefringent plate constituting the optical low-pass filter used in the sixth embodiment.
FIG. 17(b) represents a split pattern by the optical low-pass filter.

FIG. 16 is a schematic section of the sixth embodiment of the present invention. FIG. 17(a) shows the direction of beams which are split by each birefringent plate constituting the optical low-pass filter used in the sixth embodiment, and FIG. 17(b) represents a split pattern by the optical low-pass filter.

Where the structures in this embodiment are similar to those mentioned in the foregoing embodiments, the same signs are allotted to omit their explanation.

The sixth embodiment is distinguished from the above embodiments by the structure of the optical low-pass filter 70. The optical low-pass filter 70 comprises, in the laminated state, a horizontally splitting birefringent plate 702 which is machine-cut in such a manner as to split incident beams in the horizontal direction, a vertically splitting birefringent plate 704 which is machine-cut in such a manner as to split incident beams in the vertical direction, a 45-degree splitting birefringent plate 703, interposed therebetween, which is machine-cut in such a manner as to split incident beams in the 45° direction, and a 45-degree splitting birefringent plate 701, lying adjacent to the horizontally splitting birefringent plate 702, whose split direction is orthogonal to the split direction of the 45-degree splitting birefringent plate 703. The horizontally splitting birefringent plate 702 and the vertically splitting birefringent plate 704 are formed in the same thickness. Besides, the 45-degree splitting birefringent plates 701, 703 are designed in the same thickness. Each of these birefringent plates 701, 702, 703, 704 is made of quartz having square-shaped major surfaces, and formed such that the external dimension of the major surfaces are equal among these plates. In this situation, it is supposed that the 45-degree splitting birefringent plate 701 and the 45-degree splitting birefringent plate 703 have a thickness equal to $\sqrt{2}$ (the square root of two) times that of the horizontally splitting birefringent plate 702 or the vertically splitting birefringent plate 704. Then, referring to FIG. 17(b), the optical low-pass filter 70 splits the incident unit beam into twelve beams (twelve spots), as observed at the vertices (P21, P22, P23, P24, P25, P26, P27, P28, P29, P30, P31, P32) of four squares S20, S21, S22, S23 which share four points P22, P23, P25, P28. Although not shown, when the optical low-pass filter 70 of this embodiment is mounted as rotated ±90° or as reversed, it still gives the identical split pattern and ensures the same filter characteristics.

Figure 18:
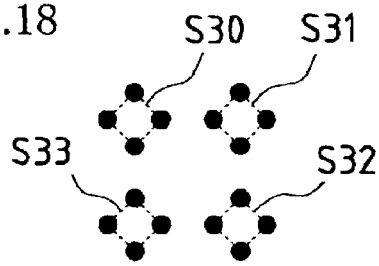
FIG. 18 represents a split pattern by the optical low-pass filter used in a modified example of the sixth embodiment.

Further, it is supposed that the 45-degree splitting birefringent plate 701 and the 45-degree splitting birefringent plate 703 have a thickness greater than $\sqrt{2}$ (the square root of two) times that of the horizontally splitting birefringent plate 702 or the vertically splitting birefringent plate 704 In this case, the incident unit beam is split into sixteen beams (sixteen spots) which are observed at the vertices of four squares S30, S31, S32, S33, as shown in FIG. 18. Similarly, when the optical low-pass filter 70 which provides this split pattern is mounted as rotated ±90° or as reversed (not shown), it still gives the identical split pattern and ensures the same filter characteristics.

Figure 19:
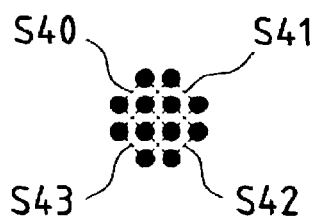
FIG. 19 represents a split pattern by the optical low-pass filter used in another modified example of the sixth embodiment.

Furthermore, it is supposed that the 45-degree splitting birefringent plate 701 and the 45-degree splitting birefringent plate 703 have a thickness less than $\sqrt{2}$ (the square root of two) times that of the horizontally splitting birefringent plate 702 or the vertically splitting birefringent plate 704. In this case, the incident unit beam is split into twelve beams (twelve spots) which are observed at the vertices of four squares S40, S41, S42, S43, as shown in FIG. 19. Similarly, when the optical low-pass filter 70 which provides this split pattern is mounted as rotated ±90° or as reversed (not shown), it still gives the identical split pattern and ensures the same filter characteristics.

<Seventh Embodiment>

Figure 20:
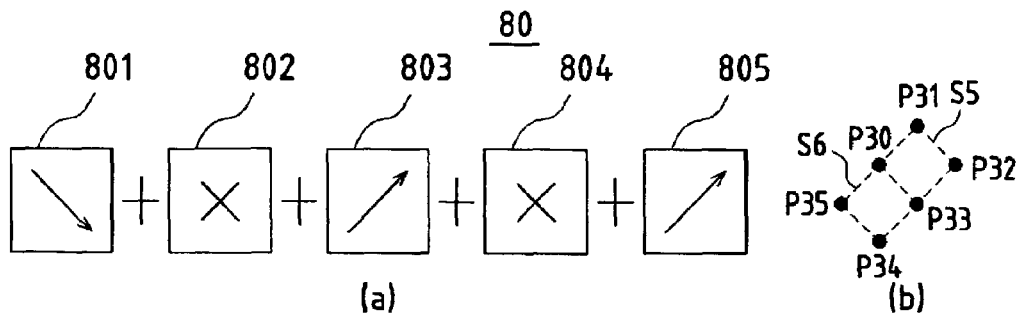
FIG. 20(a) shows the direction of beams which are split by each birefringent plate constituting the optical low-pass filter used in the seventh embodiment.
FIG. 20(b) represents a split pattern by the optical low-pass filter.

FIG. 20(a) shows the direction of beams which are split by each birefringent plate constituting the optical low-pass filter used in the seventh embodiment, and FIG. 20(b) represents a split pattern by the optical low-pass filter.

The seventh embodiment is distinguished from the above embodiments by the structure of the optical low-pass filter 80. The optical low-pass filter 80 comprises, in the laminated state, three 45-degree splitting birefringent plates 801, 803, 805 each of which is machine-cut in such a manner as to split incident beams in the 45° direction, and quarter-wave plates 802, 804 as depolarizers which are respectively interposed between the 45-degree splitting birefringent plates 801, 803, 805. Each of these birefringent plates 801, 802, 803, 804, 805 is made of quartz having square-shaped major surfaces, and formed such that the external dimension of the major surfaces is equal among these plates. Referring to FIG. 20(b), the optical low-pass filter 80 splits the incident unit beam into six beams (six spots), as observed at the vertices (P30, P31, P32, P33, P34, P35) of two squares S5, S6 which share the vertices P30, P33. According to this embodiment, when the optical low-pass filter 80 which provides this split pattern is mounted as rotated ±90° or as reversed (not shown), it still gives the identical split pattern and ensures the same filter characteristics.

With respect to the third, fourth and seventh embodiments, the depolarizer is constituted with a quarter-wave plate. However, the depolarizer may be, without limitation, a half-wave plate or a rotatory plate.

[Structures of Optical Low-pass Filters]

The optical low-pass filters 10, 20, 30, 40, 50, 60, 70, 80, mentioned in the above embodiments, may be equipped with a color compensation filter and/or an anti-reflection filter. The color compensation filter selectively eliminates or weakens a light of certain wavelength, thereby enhancing the resolution of the optical device. This color compensation filter includes an IR-cut filter, a UV-cut filter and the like. As the color compensation filter, a coating component can be formed by applying a dye or paint, or laminating a deposition film of $TiO_2$, $SiO_2$, etc., on the incident surface of the optical low-pass filter. For this purpose, the deposition material can be suitably employed. Hence, the $TiO_2$ film may be replaced with a film of $ZrO_2$ or $Nb_2O_5$, and the $SiO_2$ film may be substituted with a film of $MgF_2$. In addition, the color compensation filter can be obtained by attaching a component made, for example, of a resin material in which a dye, paint or the like is dispersed in an epoxy resin or the like. As for the anti-reflection filter, a coating component is composed of any one of $MgF_2$, $Al_2O_3$, $ZrO_2$, $TiO_2$ and $SiO_2$, or a combination thereof.

Figure 21:
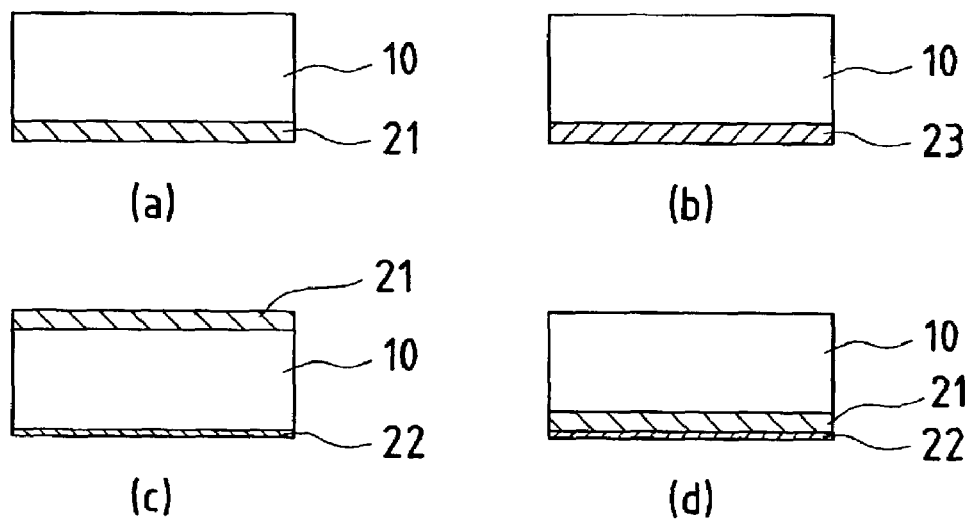
FIGS. 21(a) to (d) depict the modes of equipping the optical low-pass filter with a color compensation filter and/or an anti-reflection filter.

The color compensation filter and/or the anti-reflection filter can be provided on the optical low-pass filter in the manner illustrated in FIG. 21.

In the mode of FIG. 21(a), an IR-cut filter 21 is provided on the incident surface of the optical low-pass filter 10. In the mode of FIG. 21(b), a UV-cut filter 23 is provided on the incident surface of the optical low-pass filter 10. While these modes employ the color compensation filter alone, the anti-reflection filter or the like may be combined to incorporate a function relating to light transmission, as necessary. For example, referring to FIG. 21(c), an anti-reflection filter 22 is equipped on the incident surface of the optical low-pass filter 10, together with an IR-cut filter 21 provided on the other major surface. Otherwise, referring to FIG. 21(d), an IR-cut filter 21 and an anti-reflection filter 22 may be laminated on the incident surface of the optical low-pass filter 10.

These examples should not be construed to limit the modes of providing the color compensation filter and/or the anti-reflection filter on the optical low-pass filter. The color compensation filter is understood to comprise at least one or more of a coating component, a glass component or a resin component, which is suitably used in combination.

[Methods for Fixing Optical Low-pass Filters, and Modes of Optical Low-pass Filters Arranged Therefor]

Figure 22:
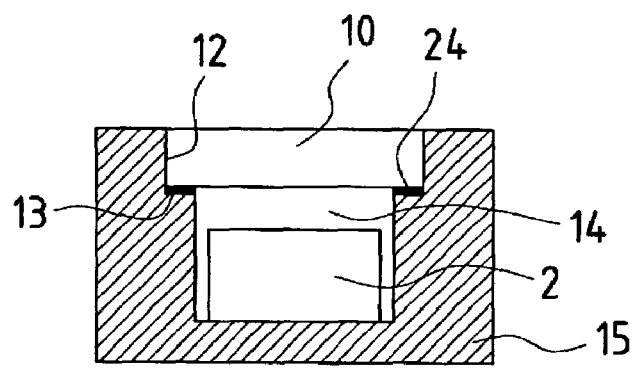
FIG. 22 describes a method for mounting the optical low-pass filter which is applied to the optical device of the present invention.

FIG. 22 describes a method for mounting the optical low-pass filter which is applied to the optical device of the present invention. FIG. 23 to FIG. 28 illustrate the structures of the optical low-pass filters applicable to this mounting method.

The optical low-pass filter 10 is fixed in the opening 12 in the package 15 by a UV-curable adhesive. As illustrated in FIG. 22, the positioning step 13 is formed along the periphery of the opening 12 in the package 15, and the UV-curable adhesive 24 is applied on the step 13, so that the optical low-pass filter 10 can be fixed securely.

Figure 23:
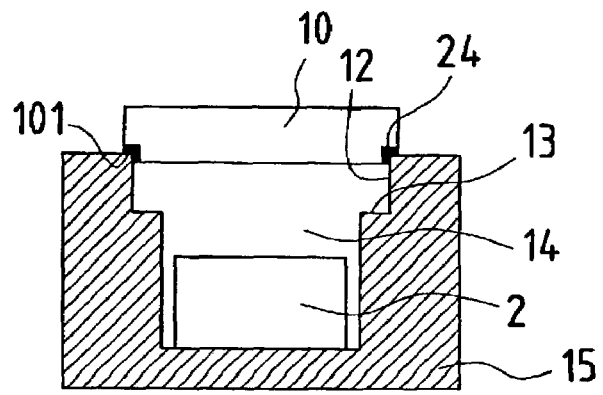
FIG. 23 to FIG. 28 illustrate the structures of the optical low-pass filters according to this mounting method.

In contrast, with respect to the structure shown in FIG. 23, a positioning step 101 is formed in the optical low-pass filter 10 along the periphery of one of its major surfaces, so that the step 101 can fit with the opening 12. The step 101 is attached in the opening 12 by the UV-curable adhesive 24. In this mode, the UV-curable adhesive 24 is sufficiently cured by the light laterally incident on the optical low-pass filter 10.

The structure of FIG. 22 may be arranged with a view to curing the UV-curable adhesive 24 more effectively. Further preferable structures of optical low-pass filters are illustrated in FIG. 24 to FIG. 28.

In these structures, the IR-cut filter 21 is formed on the incident surface of the optical low-pass filter 10. As previously pointed out, the IR-cut filter 21 hinders transmission of ultraviolet rays. However, this problem is prevented by adopting the optical low-pass filters as mentioned below.

Figure 24:
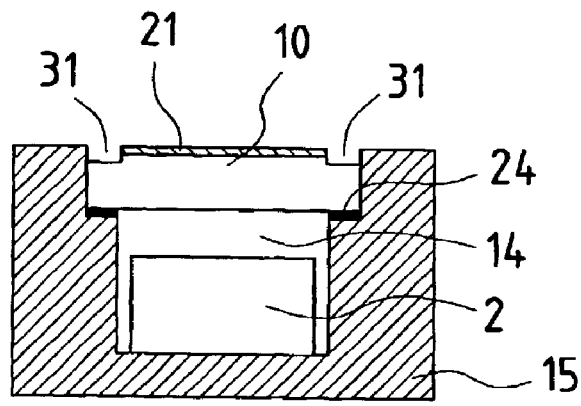

First of all, with respect to the optical low-pass filter 10 shown in FIG. 24, notches 31 are formed above the UV-curable adhesive 24 by cutting a part of the IR-cut filter 21 and a corresponding part of the optical low-pass filter 10 adjacent to the IR-cut filter 21. This structure allows ultraviolet rays to be incident on the notches 31 and to reach the UV-curable adhesive 24 more effectively, so that the UV-curable adhesive 24 can be cured well.

Figure 25:
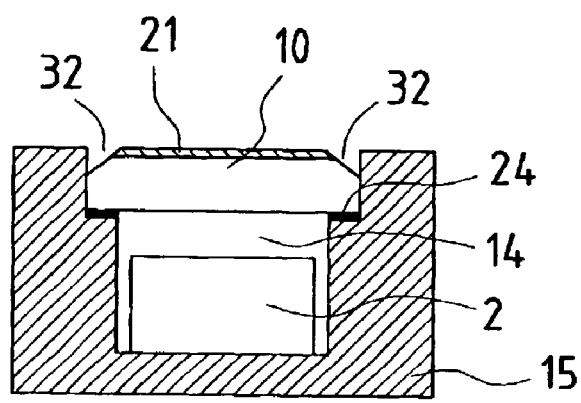

FIG. 25 shows another structure for allowing ultraviolet rays to reach the UV-curable adhesive 24 effectively. As the UV transmission area, chamfered faces 32 may be provided by chamfering the IR-cut filter 21 along the edges of the top surface of the optical low-pass filter 10 together with a corresponding part of the optical low-pass filter 10 adjacent to the IR-cut filter 21. The chamfered faces 32 bring about an additional effect of protecting the corners of the optical low-pass filter 10 from chipping or cracking.

Figure 26:
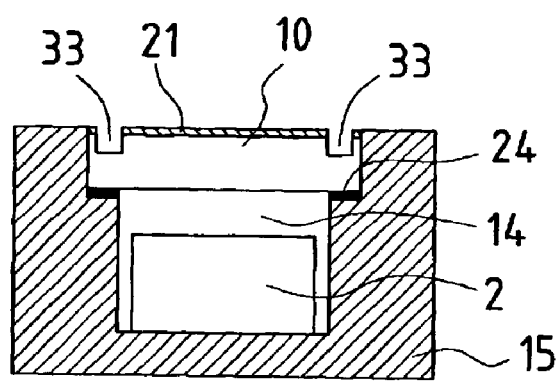

With respect to the optical low-pass filter 10 depicted in FIG. 26, angular grooves 33 are formed above the UV-curable adhesive 24 by removing a part of the IR-cut filter 21 and a corresponding part of the optical low-pass filter 10 adjacent to the IR-cut filter 21. The angular grooves 33 serve as the UV transmission area.

Figure 27:
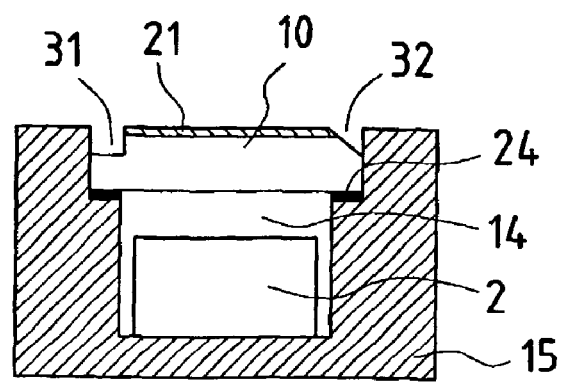

FIG. 27 shows still another structure for the UV transmission area. The top surface of the optical low-pass filter 10 includes a notch 31 provided along one of its edges and chamfered faces 32 formed along the other three edges.

Figure 28:
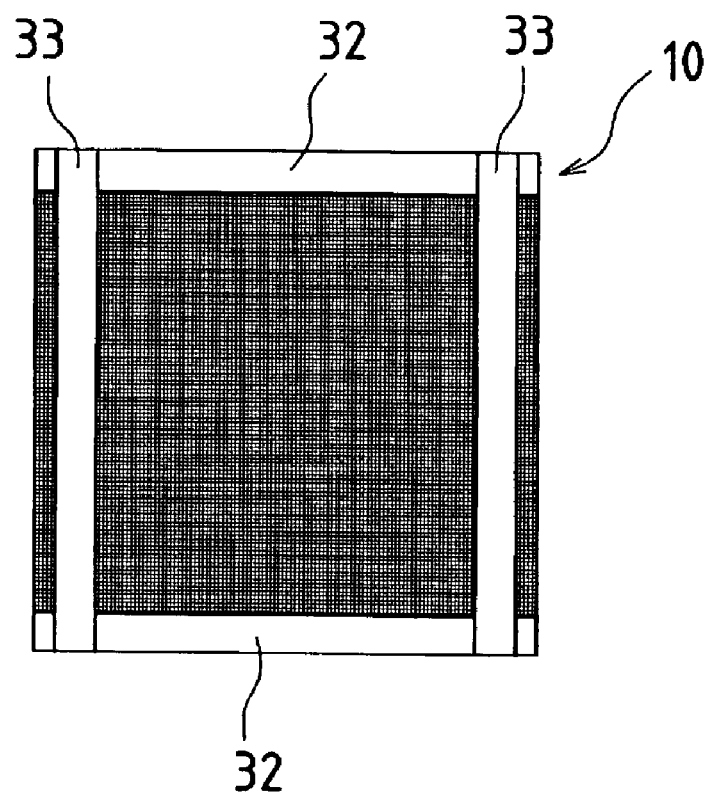

Further, in the optical low-pass filter shown in FIG. 28, an angular groove 33 is provided along each of its opposing edges, and a chamfered face 32 is formed along each of the other edges. According to the optical low-pass filter of this structure, the angular grooves 33, which are easily recognizable as the specified part, can function as a marking for clearly distinguishing between the front side and the back side or for indicating the split direction of the birefringent plate.

As already explained, the optical low-pass filters 10 of the above structures allow ultraviolet rays to reach the UV-curable adhesive 24 effectively through the UV transmission area. Consequently, the optical low-pass filter 10 seals the opening 12 in a precisely fixed manner.

As far as the above embodiments are concerned, the opening in the package is sealed with the optical low-pass filter. In addition, the optical device may be arranged to utilize a light-transmissive cover, instead of the optical low-pass filter. The following embodiments of the present invention are directed to this alternative arrangement.

<Eighth Embodiment>

Figure 29:
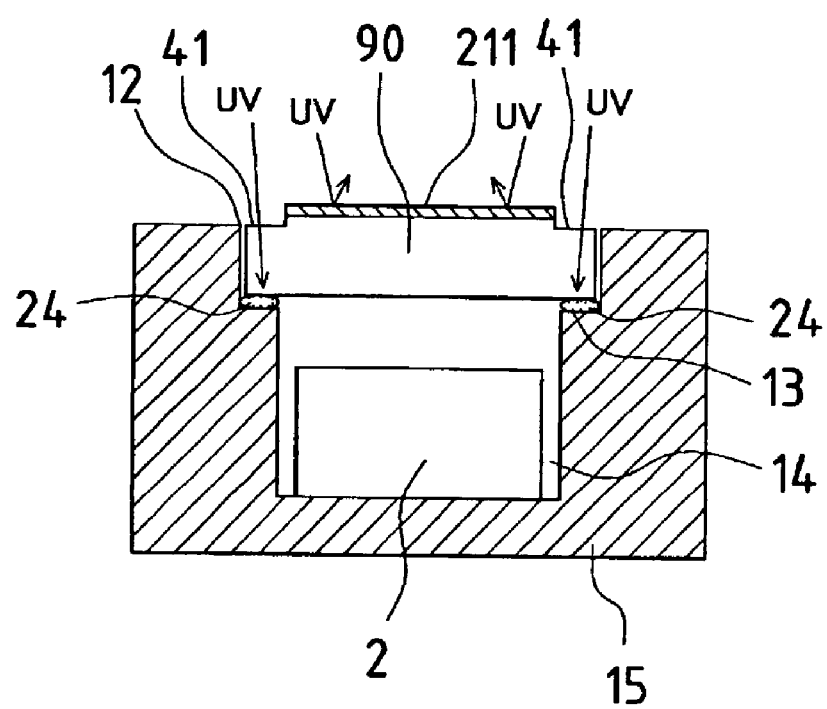
FIG. 29 is a schematic section of the eighth embodiment of the present invention.

FIG. 29 is a schematic section of the eighth embodiment of the present invention.

In the optical device of this embodiment, the image sensing device and the package structure are similar to those mentioned in the above embodiments and require no further explanation.

The optical device of this embodiment comprises a cover 90 which is fitted into the opening 12 in the package 15. As fixed on the step 13 of the package 15 by the UV-curable adhesive 24, the cover 90 seals the opening 12 in the package 15. The cover 90 is made of glass which has square-shaped major surfaces, and its top surface has an IR-cut coating 211 which is composed of 20 to 50 layers of alternately laminated $TiO_2$ films and $SiO_2$ films. In addition, the cover 90 includes notches 41 formed along its peripheral edges. The notches 41 are provided above the UV-curable adhesive 24 by removing a part of the IR-cut coating 211 and a corresponding part of the cover 90 adjacent to the IR-cut coating 211.

A method for producing this cover is hereinafter described, with reference to the illustrations of FIG. 30.

Figure 30:
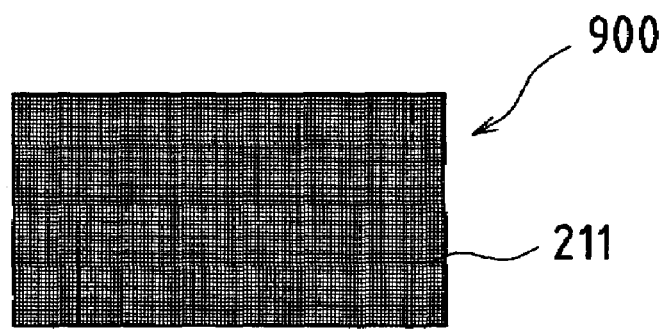
FIGS. 30(a) to (d) provide an illustrative description of a method for producing the cover shown in FIG. 29.
Figure 30:
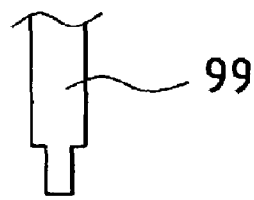
Figure 30:
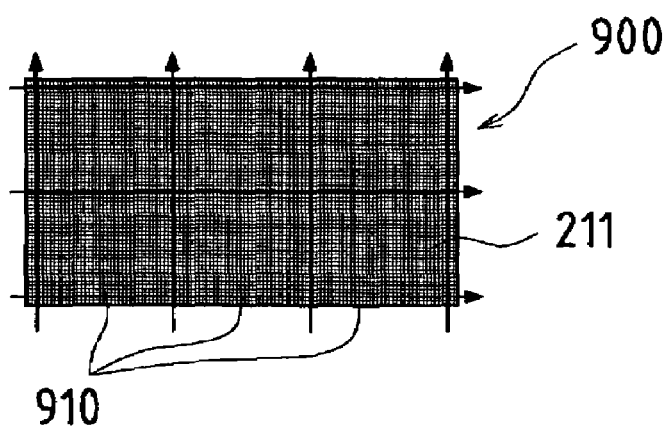
Figure 30:
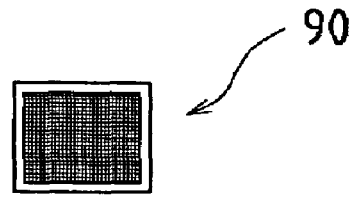

Firstly, as shown in FIG. 30(*a*), the IR-cut coating 211 is applied all over the top surface of a flat-plate wafer 900. Next, turning to FIG. 30(*c*), the wafer 900 is cut in the directions of arrows into desired small portions to give ingots 910. As illustrated in FIG. 30(*b*), a blade 99 to be employed in this cutting operation has a two-stepped sectional configuration. The blade 99 can sever the ingot 910 from the wafer 900 in a rational and efficient manner, simultaneously forming the UV transmission area. The thus obtained cover 90 is illustrated in FIG. 30(*d*).

Figure 31:
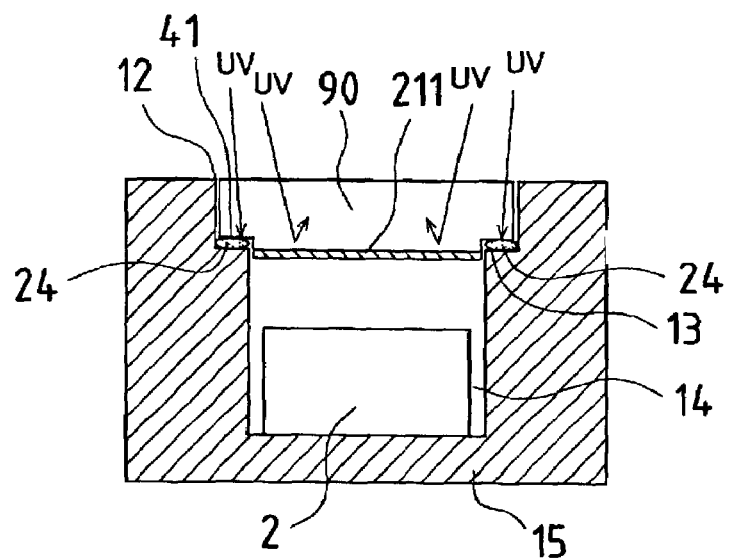
FIG. 31 is a schematic section showing a modified example of the eighth embodiment of the present invention.

Regarding the eighth embodiment, a modified example is mentioned with reference to the schematic section of FIG. 31.

In this modified example, the cover 90 shown in FIG. 30 is disposed such that the notches 41 face the step 13 of the package 15. With the notches 41 being fixed on the step 13 by the UV-curable adhesive 24, the cover 90 seals the opening 12 in the package 15. This structure also allows ultraviolet rays to reach the UV-curable adhesive 24, without hindering UV transmission.

The material for the cover 90 used in this embodiment should not be limited to glass. It is possible to utilize a quartz plate, lithium niobate, lithium tantalate, etc.

<Ninth Embodiment>

Figure 32:
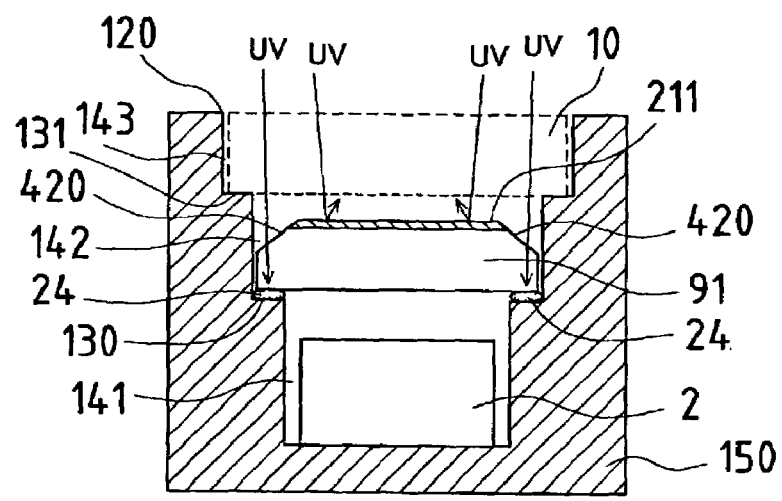
FIG. 32 is a schematic section of the ninth embodiment of the present invention.

FIG. 32 is a schematic section of the ninth embodiment of the present invention.

Where the structures in this embodiment are similar to those mentioned in the eighth embodiment, the same signs are allotted to omit their explanation.

The optical device of this embodiment comprises a CCD 2, a package 150 for accommodating the CCD 2, a cover 91 for sealing an accommodation space 141 for the CCD 2, and an optical low-pass filter 10 for sealing the opening 120 in the package 150. Similar to the above-mentioned package 15, the package 150 is made of a non-light-transmissive component and formed by resin molding. The package 150 has a two-step internal structure, in which steps 130, 131 are formed along the periphery of the inner wall. The internal structure also includes the accommodation space 141 which corresponds to the plane configuration of the CCD 2, an accommodation space 142 which corresponds to the plane configuration of the cover 91, and an accommodation space 143 which corresponds to the plane configuration of the optical low-pass filter 10.

In comparison to the eighth embodiment, the cover 91 to be mounted in this embodiment is similar in material and IR-cut coating, but distinguished by the UV transmission area which is constituted with chamfered faces 420. The chamfered faces 420 give an additional effect of protecting the corners of the cover 91 from chipping or cracking. The optical low-pass filter 10 can suitably adopt any of the structures described in the above embodiments.

The cover 91 is fixed on the step 130 of the package by the UV-curable adhesive 24. For the purpose of curing the UV-curable adhesive 24, the chamfered faces 420 transmit sufficient ultraviolet rays to the UV-curable adhesive 24, so that the cover 91 can seal the accommodation space 141 very well. As far as the structures of the above-mentioned optical low-pass filters are concerned, the optical low-pass filter can be fixed by the UV-curable adhesive to effect sealing. Nevertheless, the optical low-pass filter may be fixed on the step 131 by an adhesive.

<Tenth Embodiment>

Figure 33:
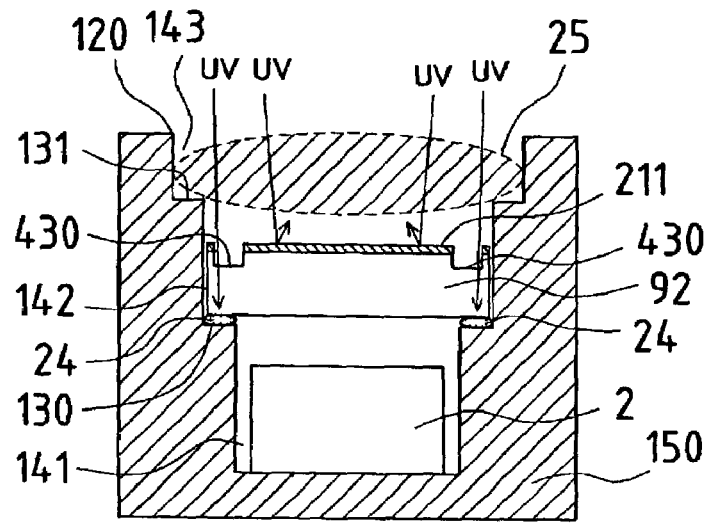
FIG. 33 is a schematic section of the tenth embodiment of the present invention.

FIG. 33 is a schematic section of the tenth embodiment of the present invention.

Where the structures in this embodiment are similar to those mentioned in the ninth embodiment, the same signs are allotted to omit their explanation.

The optical device of this embodiment comprises a CCD 2, a package 150 for accommodating the CCD 2, a cover 92 for sealing an accommodation space 141 for the CCD 2, and a convex glass lens 25 for sealing the opening 120 in the package 150. In comparison to the eighth embodiment, the cover 92 is similar in material and IR-cut coating, but distinguished by the UV transmission area which is constituted with angular grooves 430. The angular grooves 430 are formed slightly inside of the edges of the cover 92. Compared with the eighth embodiment and the ninth embodiment, the angular grooves 430, which are easily recognizable as the specified part, can function as a marking for clearly distinguishing between the front side and the back side.

The cover 92 is fixed on the step 130 by the UV-curable adhesive 24, with the angular grooves 430 facing upwards. The angular grooves 430 transmit sufficient ultraviolet rays to the UV-curable adhesive 24, thereby effecting satisfactory curing. In addition, the lens 25 is fixed on the step 131 by an adhesive.

<Eleventh Embodiment>

Figure 34:
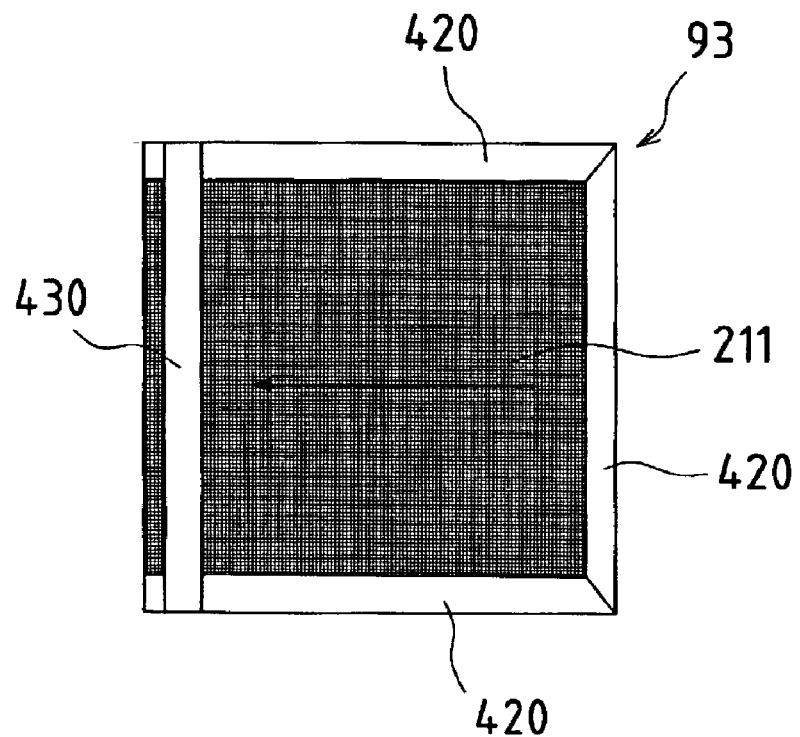
FIG. 34 is a plan view of the cover applied to the eleventh embodiment of the present invention.

FIG. 34 is a plan view of the cover applied to the eleventh embodiment of the present invention.

Except for the cover structure, this embodiment is similar to the eighth to tenth embodiments. According to this embodiment, the UV transmission area, formed in the top surface of a cover 93, is composed of an angular groove 430 provided along one of the edges and chamfered faces 420 formed along the other three edges.

Similar to the above embodiments, this UV transmission area transmits sufficient ultraviolet rays to the UV-curable adhesive and ensures satisfactory curing. As a result, the cover 93 is precisely fixed on the step, with the opening being sealed air-tightly.

Besides, in the cover 93 of this structure, the angular groove 430, which is easily recognizable as the specified part, can function as a marking for clearly distinguishing between the front side and the back side.

<Twelfth Embodiment>

Figure 35:
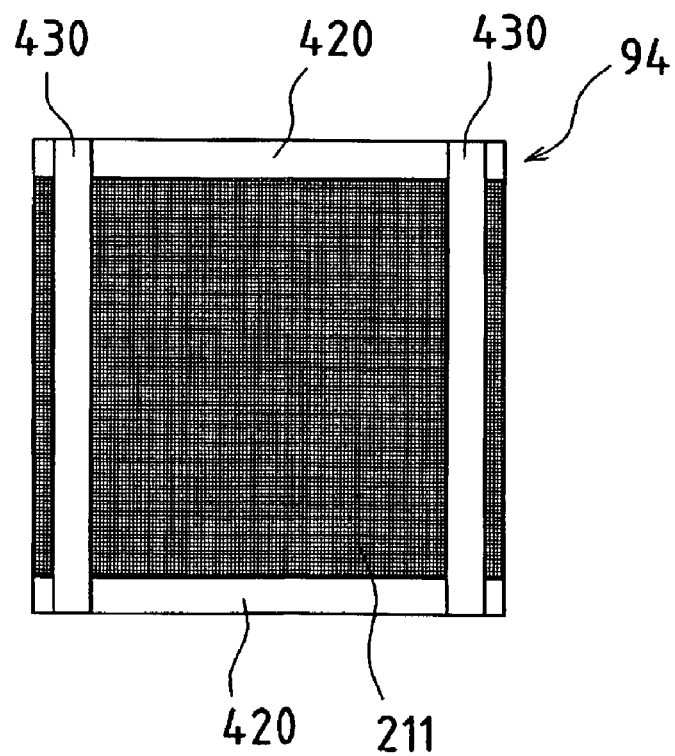
FIG. 35 is a plan view of the cover applied to the twelfth embodiment of the present invention.

FIG. 35 is a plan view of the cover applied to the twelfth embodiment of the present invention.

Except for the cover structure, this embodiment is similar to those illustrated in FIG. 32 and FIG. 33. According to this embodiment, the UV transmission area, formed in the top surface of a cover 94, is composed of an angular groove 430 provided along each of the opposing edges and a chamfered face 420 formed along each of the other edges.

Similar to the above embodiments, this UV transmission area transmits sufficient ultraviolet rays to the UV-curable adhesive and ensures satisfactory curing. As a result, the cover 94 is precisely fixed on the step, with the opening being sealed air-tightly.

Besides, in the cover 94 of this structure, the angular grooves 430, which are easily recognizable as the specified part, can function as a marking for clearly distinguishing between the front side and the back side.

In the embodiments hitherto described, the image sensing device to be mounted in the package is represented by a CCD. However, the image sensing device may be, without limitation, those like MOS.

INDUSTRIAL APPLICABILITY

As described above, the optical device of the present invention can achieve practical filter characteristics and reduce its size and weight. Besides, it is possible to lower the cost, due to the enhanced production efficiency in the production process. Moreover, depending on the application mode, the package can be sealed with either the optical low-pass filter or the cover. As a result, this optical device can be adapted to various structures and utilized in versatile fields.

The invention claimed is:

1. An optical device which is characterized in comprising: an image sensing device; a package for accommodating the image sensing device, the package including an opening of a square configuration as viewed in plan; and an optical low-pass filter having square-shaped major surfaces and provided in the opening.

2. An optical device according to claim 1, characterized in that the optical low-pass filter comprises a 45-degree splitting birefringent plate which is machine-cut in such a manner as to split an incident beam in a direction of 45 degrees and to form a two-point split pattern.

3. An optical device according to claim 1, characterized in that:

the optical low-pass filter comprises, in a laminated state, a horizontally splitting birefringent plate which is machine-cut in such a manner as to split an incident beam in a horizontal direction, a vertically splitting birefringent plate which is machine-cut in such a manner as to split an incident beam in a vertical direction, and a 45-degree splitting birefringent plate, sandwiched therebetween, which is machine-cut in such a manner as to split an incident beam in a direction of 45 degrees; and the horizontally splitting birefringent plate and the vertically splitting birefringent plate have the same thickness.

4. An optical device according to claim 1, characterized in that the optical low-pass filter comprises, in a laminated state, two birefringent plates whose split directions are orthogonal to each other, and a depolarizer interposed therebetween.

5. An optical device according to claim 4, characterized in that:

the two birefringent plates are a horizontally splitting birefringent plate which is machine-cut in such a manner as to split an incident beam in a horizontal direction, and a vertically splitting birefringent plate which is machine-cut in such a manner as to split an incident beam in a vertical direction; and these birefringent plates have the same thickness.

6. An optical device according to claim 1, characterized in that:

the optical low-pass filter comprises, in a laminated state, two birefringent plates whose split directions are orthogonal to each other, and a birefringent plate which is laid adjacent to at least one of these birefringent plates and whose split direction is rotated ±45° or ±135° relative to the adjacent birefringent plate or plates; and the two birefringent plates whose split directions are orthogonal to each other have the same thickness.

7. An optical device according to claim 1, characterized in that:

the optical low-pass filter comprises, in a laminated state, a vertically splitting birefringent plate which is machine-cut in such a manner as to split an incident beam in a vertical direction, a horizontally splitting birefringent plate which is machine-cut in such a manner as to split an incident beam in a horizontal direction, a 45-degree splitting birefringent plate, interposed therebetween, which is machine-cut in such a manner as to split an incident beam in a direction of 45 degrees, and another 45-degree splitting birefringent plate whose split direction is orthogonal to that of the first 45-degree splitting birefringent plate and which lies adjacent to either the vertically splitting birefringent plate or the horizontally splitting birefringent plate; and the vertically splitting birefringent plate and the horizontally splitting birefringent plate have the same thickness, and the first 45-degree splitting birefringent plate and the other 45-degree splitting birefringent plate have the same thickness.

8. An optical device according to claim 1, characterized in that the optical low-pass filter comprises, in a laminated state, three 45-degree splitting birefringent plates each of which is machine-cut in such a manner as to split an incident beam in a direction of 45 degrees, and a depolarizer interposed between the respective 45-degree splitting birefringent plates.

9. An optical device according to any of claims 1 to 8, characterized in that the optical low-pass filter is formed with a color compensation filter and/or an anti-reflection filter.

10. An optical device according to claim 9, characterized in that the color compensation filter comprises at least one of an IR-cut filter and a UV-cut filter.

11. An optical device according to claim 9, characterized in that the color compensation filter comprises at least one or more of a coating component, a glass component and a resin component.

12. An optical device according to claim 9, characterized in that the anti-reflection filter comprises a coating component.

13. An optical device according to any of claims 1 to 8, characterized in that the optical low-pass filter is fixed in the opening in the package by means of a UV-curable adhesive.

14. An optical device according to any of claims 1 to 8, characterized in that:

a positioning step is formed along a periphery of either the opening in the package or the optical low-pass filter; and the optical low-pass filter is attached in the opening by means of the step.

15. An optical device according to claim 9, characterized in that:

a step is formed along a periphery of the opening in the package, and the optical low-pass filter is fixed on the step by means of a UV-curable adhesive;

the color compensation filter and/or the anti-reflection filter is formed on a top surface of the optical low-pass filter; and a UV transmission area is formed above the UV-curable adhesive by removing a part of the color compensation filter and/or the anti-reflection filter and a corresponding part of the optical low-pass filter adjacent to the color compensation filter and/or the anti-reflection filter.

16. An optical device according to claim 15, characterized in that the UV transmission area is a notch formed along each edge of the top surface of the optical low-pass filter or an angular groove formed in the vicinity of each edge of the top surface.

17. An optical device according to claim 15, characterized in that the UV transmission area is formed along four edges of the top surface of the optical low-pass filter, in such a manner that the UV transmission area along one of the edges has a different configuration from the UV transmission area along the other edges.

18. An optical device according to claim 15, characterized in that the UV transmission area is formed along four edges of the top surface of the optical low-pass filter, in such a manner that the UV transmission area along opposing edges has the same configuration.

19. An optical device which is characterized in comprising: an image sensing device; a package for accommodating the image sensing device, the package including an opening of a square configuration as viewed in plan; a step formed along a periphery of the opening; and a light-transmissive cover which is fixed on the step by means of a UV-curable adhesive, and also characterized in that:

a color compensation filter and/or an anti-reflection filter is formed on a top surface of the cover; and a UV transmission area is formed above the UV-curable adhesive by removing a part of the color compensation filter and/or the anti-reflection filter and a corresponding part of the cover adjacent to the color compensation filter and/or the anti-reflection filter.

20. An optical device according to claim 19, characterized in that the UV transmission area is a notch formed along each edge of the top surface of the cover or an angular groove formed in the vicinity of each edge of the top surface.

21. An optical device according to claim 19 or 20, characterized in that the UV transmission area is formed along four edges of the top surface of the cover, in such a manner that the UV transmission area along one of the edges has a different configuration from the UV transmission area along the other edges.

22. An optical device according to claim 19 or 20, characterized in that the UV transmission area is formed along four edges of the top surface of the cover, in such a manner that the UV transmission area along opposing edges has the same configuration.

* * * * *